(12) United States Patent
Schulz

(10) Patent No.: US 10,091,066 B2
(45) Date of Patent: Oct. 2, 2018

(54) INTEGRATION METHOD AND SYSTEM

(71) Applicant: ABB Technology AG, Zurich (CH)

(72) Inventor: Dirk Schulz, Meckenheim (DE)

(73) Assignee: ABB Schweiz AG, Baden (CH)

(*) Notice: Subject to any disclaimer, the term of this patent is extended or adjusted under 35 U.S.C. 154(b) by 221 days.

(21) Appl. No.: 14/911,033

(22) PCT Filed: Sep. 11, 2014

(86) PCT No.: PCT/EP2014/069351
§ 371 (c)(1),
(2) Date: Feb. 9, 2016

(87) PCT Pub. No.: WO2015/036462
PCT Pub. Date: Mar. 19, 2015

(65) Prior Publication Data
US 2016/0182304 A1 Jun. 23, 2016

(30) Foreign Application Priority Data
Sep. 13, 2013 (EP) .................................. 13004471

(51) Int. Cl.
*H04L 12/24* (2006.01)
*G05B 19/418* (2006.01)

(52) U.S. Cl.
CPC .......... *H04L 41/12* (2013.01); *G05B 19/4185* (2013.01); *H04L 41/14* (2013.01);
(Continued)

(58) Field of Classification Search
None
See application file for complete search history.

(56) References Cited
U.S. PATENT DOCUMENTS 8,055,727 B2 * 11/2011 Cahill .................. G05B 23/027
  700/1
8,159,961 B1 * 4/2012 Rai ........................ H04L 67/42
  370/252
(Continued)

FOREIGN PATENT DOCUMENTS

EP  1594023 A2  11/2005
EP  2244146 A1  10/2010
(Continued)

Primary Examiner — Viet D Vu
Assistant Examiner — James A Edwards
(74) Attorney, Agent, or Firm — Leydig, Voit & Mayer, Ltd.

(57) ABSTRACT

An integration system and method, for a more efficient integration of communication devices in a distributed device management system (DMS), has several FDI and OPC UA components to be applied to and/or integrated in a DMS and providing one or more processing units, in particular at least one discovery unit as well as executable data structures, to discover and determine distributed operable communication servers and/or devices, in particular independent from their location, so to say independent whether they are located within the components of the DMS like for example the FDI servers, the FDI clients, OPC UA discovery servers or stand-alone in the engineering/control/field network, as well as to a corresponding DMS comprising said system and/or performing said method.

20 Claims, 10 Drawing Sheets

(52) U.S. Cl.
CPC ............ *G05B 2219/25296* (2013.01); *G05B 2219/35413* (2013.01); *H04L 41/00* (2013.01); *Y02P 90/18* (2015.11)

(56) References Cited

U.S. PATENT DOCUMENTS

| | | | | |
|---|---|---|---|---|
| 2007/0067725 | A1* | 3/2007 | Cahill | G05B 23/027 |
| | | | | 715/733 |
| 2007/0198752 | A1 | 8/2007 | Danz et al. | |
| 2008/0052394 | A1* | 2/2008 | Bugenhagen | H04L 12/14 |
| | | | | 709/224 |
| 2010/0315198 | A1* | 12/2010 | Jurisch | G05B 19/042 |
| | | | | 340/5.2 |
| 2012/0143586 | A1* | 6/2012 | Vetter | G05B 19/042 |
| | | | | 703/20 |
| 2012/0236768 | A1* | 9/2012 | Kolavennu | H04L 69/08 |
| | | | | 370/310 |
| 2013/0211547 | A1* | 8/2013 | Buchdunger | G05B 19/0426 |
| | | | | 700/11 |
| 2014/0136680 | A1* | 5/2014 | Joshi | H04L 43/026 |
| | | | | 709/224 |

FOREIGN PATENT DOCUMENTS

| | | |
|---|---|---|
| WO | WO 2005093530 A2 | 10/2005 |
| WO | WO 2013091873 A1 | 6/2013 |

\* cited by examiner

INTEGRATION METHOD AND SYSTEM

CROSS-REFERENCE TO RELATED APPLICATIONS

This application is a U.S. national stage application under 35 U.S.C. § 371 of International Application No. PCT/EP2014/069351, filed on Sep. 11, 2014, and claims benefit to European Patent Application No. 13 004 471.2, filed on Sep. 13, 2013. The International Application was published in English on Mar. 19, 2015, as WO 2015/036462 A1 under PCT Article 21(2).

FIELD

The invention relates to an integration method and system for a more efficient integration of communication devices in a distributed Device Management System (DMS) as well as a Device Management System comprising said integration system and/or performing said integration method.

BACKGROUND

In a common distributed Device Management System (DMS), the system functions are distributed over server and client machines, which typically are remote from each other. To support device management in workshop scenarios or on mobile clients in the field, communication devices such as HART FSK modems are required alongside the client machines, i.e. also remote from the server. HART (Highway Addressable Remote Transducer refers to a digital industrial automation protocol for the digital communication of in particular field devices in a plant automation site.

If DMS functions such as device-specific business logic or support for nested communication are hosted on the server or server machine, the client-side communication devices and the server-side functions must be integrated with each other, preferably in an easy and robust manner.

The approaches from classic device integration technologies such as FDT (Field Device Tool) cannot be applied anymore, and next-generation technologies such as FDI (Field Device Integration) do not specify technical solutions for this situation.

Field Devices, like in particular metering devices, sensors, valves or drives or actuators, are an integral part of any Distributed Control System (DCS). They perform the sensing and actuation functions which the DCS requires to have any notion or conception of the state of the process to control. Without field devices, the DCS would basically be blind and incapable of any action. These field devices must be parameterized, commissioned, and their health and operation condition has to be monitored during the operation of the plant. For this task device tools with knowledge and/or capabilities of a specific communication technology, device, or family of devices are used. These tools are either implemented as stand-alone software components to directly communicate with each physical device or as modular integration components.

A Device Management System (DMS) can be regarded as a framework into which these integration components can be integrated. The DMS offers and/or requires defined functions to or from the integrated tools in order to provide system-level functions beyond the means of each individual tool. This may include the representation of the physical field topology and the integration of all tool-supplied user interfaces.

A main function or object of a DMS is to provide data access from the individual device tools to their belonging or corresponding field devices via a hierarchical communication infrastructure.

A state-of-the-art DMS architecture provides integration components for devices, containing device-specific know-how for parameterization and diagnosis, and gateways, translating between protocols, and are realized in a modular manner. Communication traverses a hierarchy of nested gateway tools corresponding to the field topology of gateway devices which may be none or many. The transition between the DMS data structures and the physical world may be realized via dedicated communication tools which have hardware access to the first physical interface in the communication hierarchy.

In a distributed DMS, device, gateway, and communication tools may be hosted within multiple client and server data structures and/or software components.

Typically, there will be a single server, in particular a redundant server arrangement. For large systems, multiple servers may be introduced but each server is assigned only to a partition or part of the field topology In a distributed DMS, executable client and server data structures may be deployed to client and server machines. The communication tools may even be implemented directly on or applied to the communication devices.

In a stand-alone or single-node DMS, all client and server functions may even be deployed to a single machine. Particularly for Ethernet communication, a communication device may also be hosted within the server machine.

Unfortunately, in any real system, like for example when using an FDI DMS, the client and server functions have to be deployed onto runtime machines. Using e.g. an FDI DMS, these situations arise:

In distributed deployment scenarios where all communication devices are connected to the FDI server, nested communication can occur in straight-forward manner; the FDI communication servers are installed on the same machine as the FDI server and a communication manager is provided which determines the communication path by analyzing the FDI Information Model. In particular, the FDI server ensures and provides that the communication devices, representing critical resources, can be shared between all users/clients.

The same holds or applies for single-node systems where all functions reside on the same machine.

However, a typical workshop scenario requires the communication devices to be available at the client machines where the physical devices are also located. These clients may be stationary or may be mobile, temporarily available machines.

In conclusion, the locally attached communication devices may only be available temporarily or at least may be "owned" by the connecting client—they should exactly not be shared between other clients on other client machines and other users. They connect to devices which are or will be engineered as part of an "operative" field topology but at the time are accessed through a separate, temporary connection. It appears inefficient and unnecessary to explicitly engineer a second, "non-operative" topology for temporary use.

Furthermore, this means that also the connected devices are only reachable via the local communication device temporarily.

Connecting the communication devices locally and still installing the corresponding communication servers on the FDI server seems to be no satisfying and advisable solution for several reasons:

For HART, PROFIBUS, Foundation Fieldbus HART serial or USB modems, etc., access to local hardware is required; this is exactly the reason why the FDI standard proclaims communication servers as separate entities which may include binary code to access hardware outside of the EDD (Electronic Device Description) engine. In this sense, having a communication server remote from the client is even technically impossible.

In a distributed (multi-node) FDI system, where FDI client and FDI server reside on at least two different machines, bypassing the FDI server for communication is not advisable, either:

To achieve nested communication along a path in the topology, the Communication Manager residing on the FDI server must have knowledge of and access to the distributed communication servers on the client machines. As a device description may also include business logic for download, circumventing the FDI communication mechanisms entirely from the client is not possible, either; the content of the communication must be controlled from within the EDD engine, which also resides on the server.

For industrial Ethernet protocols, running IP or Ethernet communication in parallel to the client would mean running (possibly not even routable) fieldbus traffic within the engineering network.

Accordingly, a solution is required which allows client-side communication servers and their communication devices to be made available easily to the communication manager within the FDI server, in particular deployed on a separate, remote server machine to increase network efficiency and quality and/or data transfer capacity. This has to be done in a manner that the temporary nature and ownership of the communication devices can be taken into account by the respective communication manager.

Thus all communication devices and their servers must be registered centrally with the FDI server. This leads to a situation where a communication server on one client could be accessed by a transaction (such as a download) triggered on another client. This appears inefficient and leads to lower usability for the end user.

Simply duplicating an entire FDI system on the client does not solve this issue. Firstly, all engineering data must still be synchronized with the main FDI server, which is also expected to have the current and valid engineering data stored; FDI provides no immediate solution to keep several servers synchronized automatically and reliably. Secondly, this does not resolve the problem of having multiple temporary communication topologies.

At that time no efficient technical solution for this is provided by the FDI standard draft, and the draft status of the standard naturally prohibits any product to already exist.

SUMMARY

An aspect of the invention provides an integrated system for a more efficient integration of communication devices in a distributed device management system (DMS), the integrated system comprising: two or more FDI and/or OPC UA components, to be applied to and/or integrated in a DMS; and a first processing unit, wherein the integrated system is configured to discover and determine distributed operable communication servers and/or devices.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
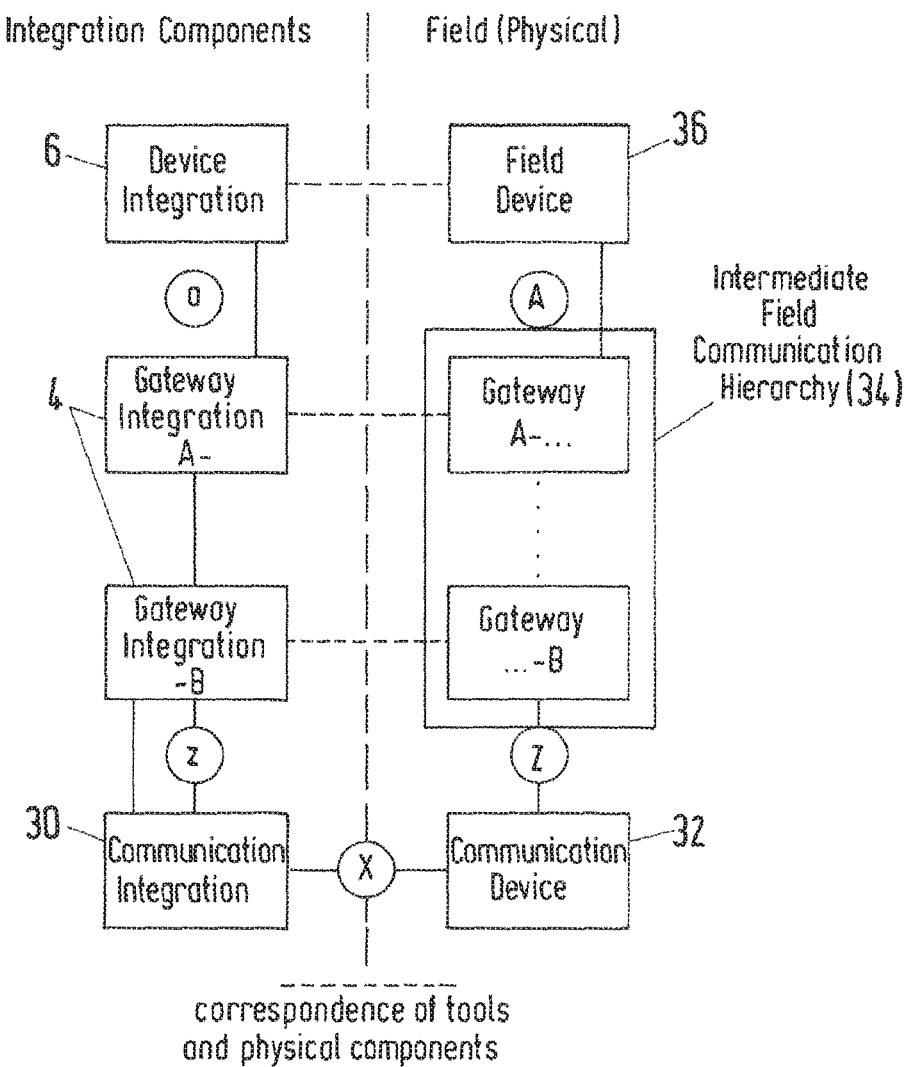
FIG. 1 a diagram illustrating nested communication in a distributed DMS according to the state of the art practice.

An aspect of the invention provides an improved and more efficient device integration possibility for the integration of communication devices in a device management system, which leads to a more efficient, meaning performing and reliable, communication capability of the DMS and the respective communication network and which leads to better usability from the user perspective.

Another important aspect of this invention is to provide such improvement while fully maintaining compliance with the FDI standard, i.e. by not changing any standardize part of the discovery process, the communication topology representation, and online communication management, but by adding on and/or applying standard mechanisms or advantageously implementing functions that are not covered entirely by the standard.

For example, the FDI standard defines how to use OPC UA discovery, and it defines how a Communication Manager is to traverse the communication topology in order to find suitable communication devices to support online connection to a physical device. However, it does not define how technically possible connections are evaluated, what is a suitable way to select one of several paths to a device, and how to efficiently create the communication topology in case of dynamic/temporary connections of field devices (as they typically appear during e.g. device commissioning) or of communication devices and servers (as they appear on stationary or mobile FDI clients).

An aspect of the invention provides an integration method and system for a more efficient and dynamic integration of communication devices in a distributed device management system (DMS) according to the features of the independent claims. Further, embodiments and developments of said system and method as well as a DMS using or comprising said technical solutions are disclosed in the depending claims and the following description.

An integration system for a more efficient integration of communication devices in a distributed device management system (DMS) comprising several FDI and OPC UA components is proposed to be applied to and/or integrated in a DMS and providing processing means, in particular at least one discovery unit as well as executable data structures, to discover and determine distributed operable communication servers and/or devices, in particular independent from their location, so to say independent whether they are located within the components of the DMS like for example the FDI servers, the FDI clients, OPC UA discovery servers or stand-alone in the engineering/control/field network.

In one embodiment the integration system as well as its processing means are based on FDI and OPC UA technology, where the processing means and in particular the discovery unit, determine and collect from all DMS machines, which in deed means all clients and servers, the locally available communication devices and/or provide said information to a respective server, to enable the server to direct communication requests to a field device via any suitable communication device, taking into account where field and communication device are located and who owns them in the current device workflow.

In particular, this allows for both a sharing of backbone infrastructure via the server and a protection of client-side communication devices against use from other clients.

In a further refinement the discovery unit and the corresponding discovery mechanism or process provide at least one of
- explicit engineering, like for example an instantiation of communication server references,
- scanning from the server, in particular by a FDI server or the discovery server,
- self-registration of the communication servers on a central discovery server,
- registration of communication servers on the client side, in particular within the local discovery servers.

In a further embodiment the discovery server and/or the discovery unit determines and remembers the location of the discovered communication servers and/or devices, distinguishing at least between
- controller-internal,
- field-device-internal,
- stand-alone machine,
- FDI server machine
- FDI client machine.

In a further refinement the respective information is stored on the server machine, in particular within the FDI server or the local discovery server.

In a further embodiment the FDI communication manager relates and/or links and/or correlates the origin of each communication request to the location of each communication device that the communication manager considers using, wherein in particular origin being a trigger in business logic running on the server or a trigger running in a software on an FDI client or a user decision entered into an FDI client, like for example an explicitly triggered parameter download. The communication manager of the DMS uses the provided information to smartly direct nested communication requests to the respective communication servers and/or devices and in particular the information may be used to
- select the communication path, in particular including the communication device,
- synchronize access to communication devices that are to be shared,
- prevent unwanted access to communication devices that are not to be shared, in particular the ones connected to the distributed FDI clients,
- balance communication loads,
- prioritize the communication devices when enumerating multiple possible communication paths, and to
- prioritize the communication devices when requesting (time-consuming) live lists from communication devices Furthermore, in another embodiment the FDI Client, connecting to the FDI server, becomes a known IP host.

According to another refinement, the communication servers register along with the FDI clients using OPC UA discovery as used by the FDI standard; by this approach, the FDI server becomes aware of all communication servers. The FDI server can then register which of the communication servers are running on which machine.

In an exemplary embodiment a second communication server on a machine may register with the central OPC UA discovery server. This requires the central discovery server to be known to each communication server.

In another exemplary embodiment a second communication server on a machine registers with the second local OPC UA discovery server. This requires no configuration of the communication server.

Furthermore, using the IP address, the FDI server queries the OPC UA discovery server on the FDI Client, thus learning about all locally running FDI communication server. Alternatively, the FDI server may request the local discovery server to perform the query and read in the updated information model of the discovery server.

It may also check the availability and/or operability of the connected communication devices.

In a further embodiment the core registration mechanism itself is defined by the OPC UA standard and works in the same manner on any machine.

Furthermore, the FDI server may reflect the discovery results within the standard communication devices directory.

Moreover, the communication manager requires no dedicated support to enumerate any of the available communication devices.

In another embodiment, a rating of available communication devices is provided and/or performed, wherein to support the rating of available communication devices and to enforce access rights on them, the OPC UA object type for communication devices is enhanced with a host attribute referencing the machine on which it is deployed.

In a further embodiment, when handling communication requests from any active FDI component, path finding means, in particular a path finding unit and/or function, are provided and/or applied to the communication manager, which analyze possible communication paths. Furthermore, the path finding means may rate each candidate and/or possible path by applying a rule set, depending on where the request comes from and where the communication server is hosted. If the request comes from an FDI client, only communication servers on the server machine or on the client machine are used. Clients do not get access to each other's communication devices.

Furthermore, in addition to restrict the enumeration of valid communication paths, the system provides means which further restrict the user visibility of unusable communication devices on the client.

In an exemplary embodiment when a second communication device is connected to a first client, and a third communication device is connected to a second client, wherein actual communication, even though being directed from the server always goes through the client machines and the overall accessibility and visibility may be as follows:

|  | Communication Device 1 | Communication Device 2 | Communication Device 3 | Communication Device 5 |
| --- | --- | --- | --- | --- |
| Client 1 | yes | yes | no | Yes |
| Client 2 | yes | no | yes | Yes |
| Server | yes | yes | yes | Yes |

In a further embodiment, regardless of the discovery method, a fifth communication device with an embedded communication server is made visible like a communication device whose communication server is running on the device management system's server machine. For shared infrastructure components such as fieldbus masters, remote IOs, gateways, etc. the location of the communication server thus does not matter and/or is not relevant.

Furthermore, showing to a user only communication devices usable on the client they are using may be implemented either directly on the client by applying a suitable filter or the server may provide only the list of usable communication devices to a client upon inquiry.

In a further refinement, the functionality of showing or presenting to a user only communication devices usable on the client and communication devices which are using said client may be implemented either directly on the client by applying a suitable filter or may be provided by the server by a list of usable and/or applicable communication devices to a client upon inquiry In a further refinement, in addition to these functions and methods, means are provided for a server to restrict the access to communication devices upon explicit request by a user or because they are already in use for active communication by another user, client, or system function. This restriction may be required because of bandwidth limitations to protect a defined QoS (Quality of Service), because the number of parallel connections through a given path is limited and/or to avoid race conditions on write access.

Furthermore, means are provided so that a client may indicate such use of otherwise available communication devices and paths to a user to guide their level of information and expectations for better usability.

From a user or DMS and network administration perspective, this approach is fully transparent. It allows any deployment of communication devices as required by the use-cases and scenarios such as workshops and mobile clients.

In a further embodiment visualization means are provided offering a visualization of available communication devices in the client, in particular regardless if the client filters out restricted communication devices or if the server already does.

Furthermore, a visualization of the current use of otherwise available communication devices and paths, for example of communication devices and paths which are used by another user, client, or system function, may be offered and/or provided.

Furthermore, the object is also solved by a corresponding integration method, wherein distributed operable communication servers and/or devices, in particular independent from their location, so to say independent whether they are located within the components of the DMS like for example the FDI servers, the FDI clients, OPC UA discovery servers or stand-alone in the engineering/control/field network, are discovered and determined.

Furthermore, said integration method is based on FDI and OPC UA technology, wherein from all DMS machines, which in deed means all clients and servers, the locally available communication devices are determined and collected and said information is provided to a respective server, to enable the server to direct communication requests to a field device via any suitable communication device, taking into account where field and communication device are located and who owns them in the current device workflow.

In a further refinement, a sharing of backbone infrastructure via the server and a protection of client-side communication devices against use from other clients is provided.

In another refinement, the discovery mechanism or process provides and/or performs at least one of explicit engineering, like for example an instantiation of communication server references,
scanning from the server, in particular by the FDI server or the discovery server,
self-registration of the communication servers on a central discovery server,
registration of communication servers on the client side, for example within the local discovery servers.

Furthermore, the location of the discovered communication servers and/or devices, may be determined and remembered and a differentiation at least between
controller-internal,
field-device-internal,
stand-alone machine,
FDI server machine, and
FDI client machine may be performed.

In another implementation of the integration method all the information about the he locally available communication devices is being stored on the server machine, in particular within the FDI server or the local discovery server.

Furthermore, the communication manager of the DMS may relate and/or link and/or correlate the origin of each communication request to the location of each communication device that the communication manager considers to use.

In another embodiment, the communication manager of the DMS uses the provided information to smartly direct nested communication requests to the respective communication servers and/or devices and in particular the information may be used to
select the communication path, in particular including the communication device,
synchronize access to communication devices that are to be shared,
prevent unwanted access to communication devices that are not to be shared, in particular the ones connected to the distributed FDI clients,
balance communication loads,
prioritize the communication devices when enumerating multiple possible communication paths, and to
prioritize the communication devices when requesting (time-consuming) live lists from communication devices.

In a further refinement, a rating of available communication devices is performed and/or executed, wherein to support the rating of available communication devices and to enforce access rights on them, the OPC UA object type for communication devices is enhanced with a host attribute referencing the machine on which it is deployed.

Furthermore, it may be provided that when handling communication requests from any active FDI component possible communication paths are analyzed and/or each candidate and/or possible path is rated by applying a rule set, depending on where the request comes from and where the communication server is hosted and/or if the request comes from an FDI client, only communication servers on the server machine or on the client machine are allowed to be used.

The proposed solution allows an easy registration of client-side communication servers with the Communication Manager; easy means the amount of required manual work should be minimal, and/or provides an access rights management for client-side communication servers, granting exclusive or at least preferred access for communication requests originating from within the client; this includes communication that is only indirectly triggered from the client, and/or support of communication devices with builtin communication servers which are still co-located to a single client, and/or a re-use of existing mechanisms from the base technology OPC UA and/or a re-use of basic FDI mechanisms (i.e. minimize the need to have special code parts to achieve a solution).

In FIG. 1 a diagram illustrating nested communication in a distributed DMS is presented, wherein the main function or object of a DMS is to provide data access from the individual device tools or device integration components 6 to their belonging or corresponding field devices 36 via a hierarchical communication infrastructure 34.

A state-of-the-art DMS architecture provides integration components for devices 6, containing device-specific know-how for parameterization and diagnosis, and gateways 4, translating between protocols 34 and are realized in a modular manner.

Communication traverses a hierarchy of nested gateway tools corresponding to the field topology of gateway devices which may be none or many.

The transition between the DMS software or data structures and the physical world may be realized via dedicated communication tools or communication integration components 30 which have hardware access to the first physical interface—a communication device 32—in the communication hierarchy.

Figure 2:
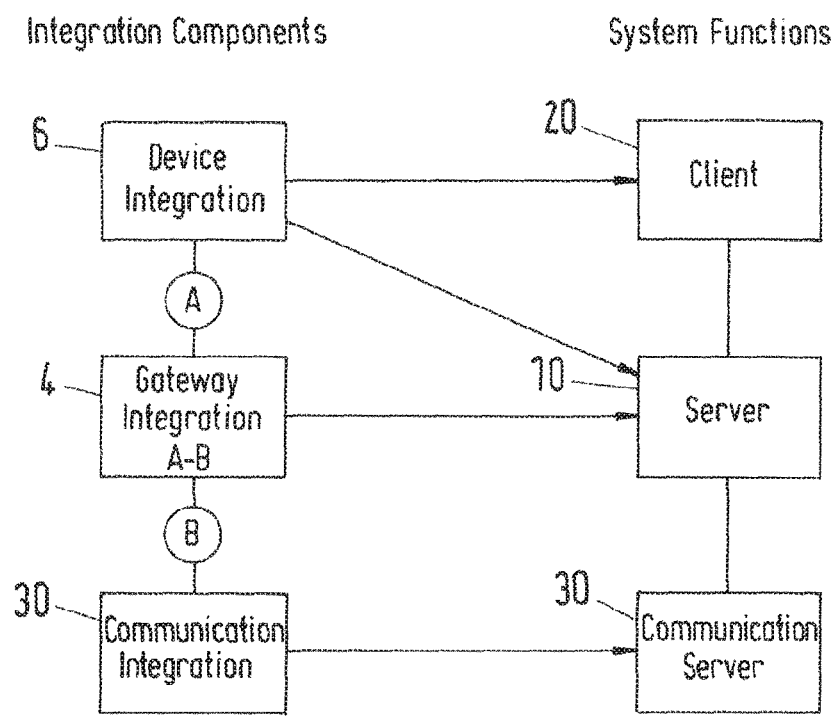
FIG. 2 a chart for the hosting of integration components according to the state of the art.

FIG. 2 discloses a chart related to the hosting of integration components according to the state of the art, wherein in a distributed DMS, device, gateway, and communication tools 6,4, 30 may be hosted within multiple client 20 and server 10 software components.

Figure 3:
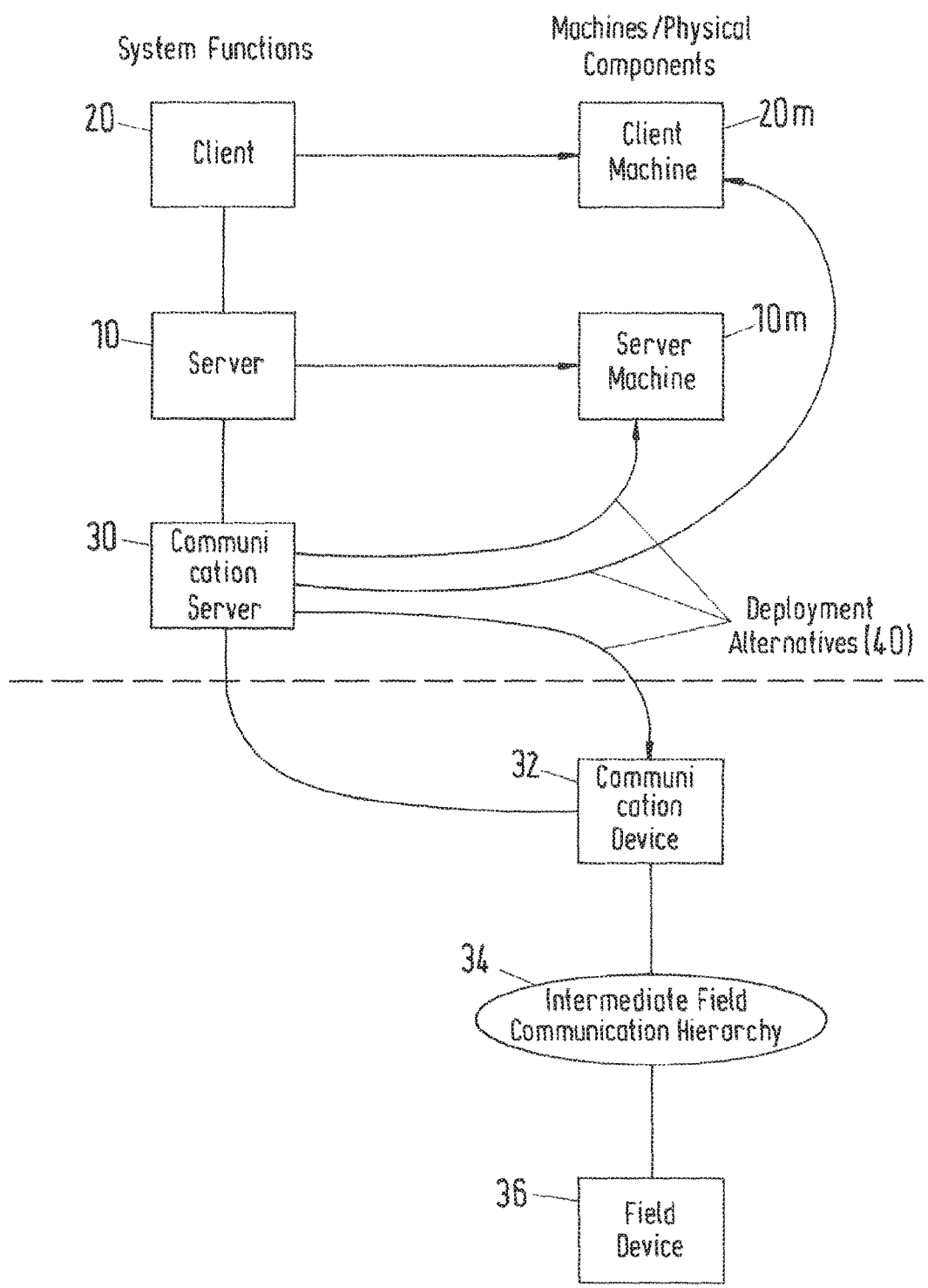
FIG. 3 a chart illustrating the deployment mechanism and/or process.

Typically, there will be a single server, in particular a redundant server 10 arrangement. For large systems, multiple servers may be introduced but each only for a partition or part of the field topology In FIG. 3 a chart illustrating the deployment mechanism and/or process is presented.

In a distributed DMS, the client 20 and server 10 software components may be deployed to client machines 20*m* and server 10*m* machines and communication devices 32 as embedded servers. The communication tools or communication integration components 30 may even be implemented or applied directly on the communication devices 32.

In a stand-alone or single-node DMS, all client 20 and server 10 functions may even be deployed to a single machine.

Particularly for Ethernet Communication, a communication device 32 may also be hosted within the server machine 10*m*.

In any real system, the client and server software functions 6, 4, 30 must be deployed onto runtime machines 10*m*, 20*m*. Using e.g. an FDI DMS, the following situations may arise:

In distributed deployment scenarios where all communication devices are connected to the FDI server, nested communication can occur in straight-forward manner; the FDI communication servers 30 are installed on the same machine 10*m* as the FDI server 10 and the communication manager determines the communication path by analyzing the FDI information model. In particular, the FDI server makes sure that the communication devices 32, representing critical resources, can be shared between all users/clients.

The same holds for or applies to single-node systems where all functions 6, 4, 30 reside on the same machine combining 10*md*, 20*md*.

Figure 3A:
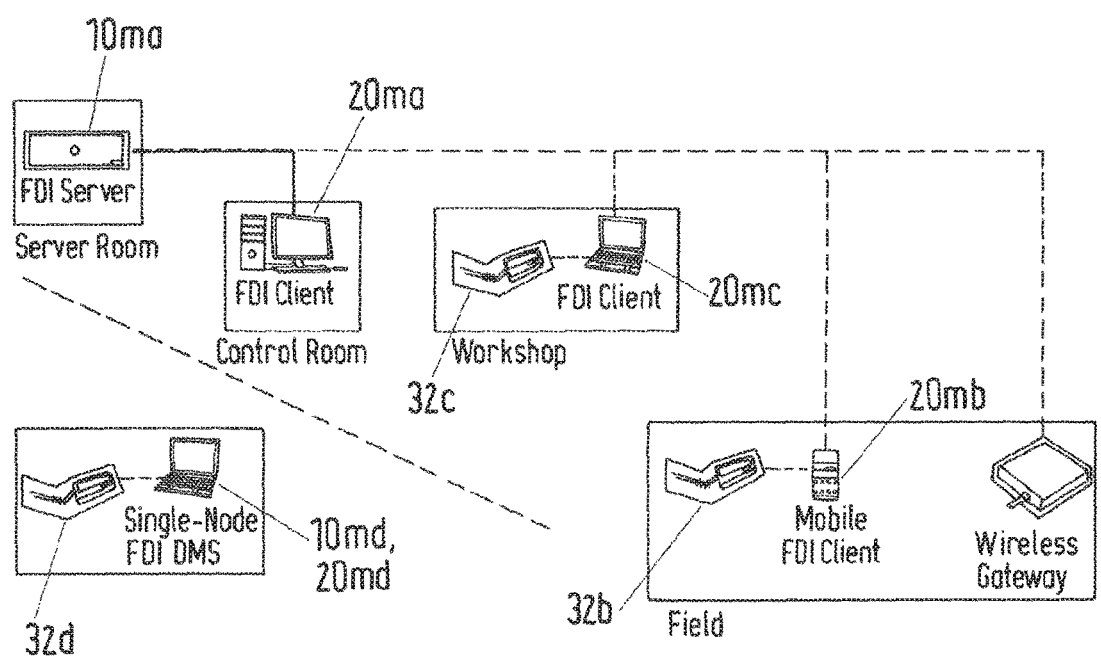

However in FIG. 3*a* an exemplary workshop scenario is presented, which requires the communication devices 32*b, c,d* to be available at the client machines (20*mb,mc,md*) where the physical devices are also located. These clients may be stationary or may be mobile, temporarily available machines.

In conclusion, the locally attached communication devices 32*b,c,d* may only be available temporarily or at least may be "owned" by the connecting client—they should exactly not be shared between other clients, on other client machines and other users. They connect to devices which are or will be engineered as part of an "operative" field topology but at the time are accessed through a separate, temporary connection.

Connecting the communication devices 32*b,c,d* locally and still installing the corresponding communication servers on the FDI server 10*ma* is no solution for several reasons:

For HART, PROFIBUS, Foundation Fieldbus HART serial or USB modems, etc., access to local hardware is required; this is exactly the reason why the FDI standard proclaims communication servers as separate entities which may include binary code to access hardware outside of the EDD engine.

For Industrial Ethernet protocols, running IP or Ethernet communication in parallel to the client would mean running (possibly not even routable) fieldbus traffic within the engineering network.

Figure 4:
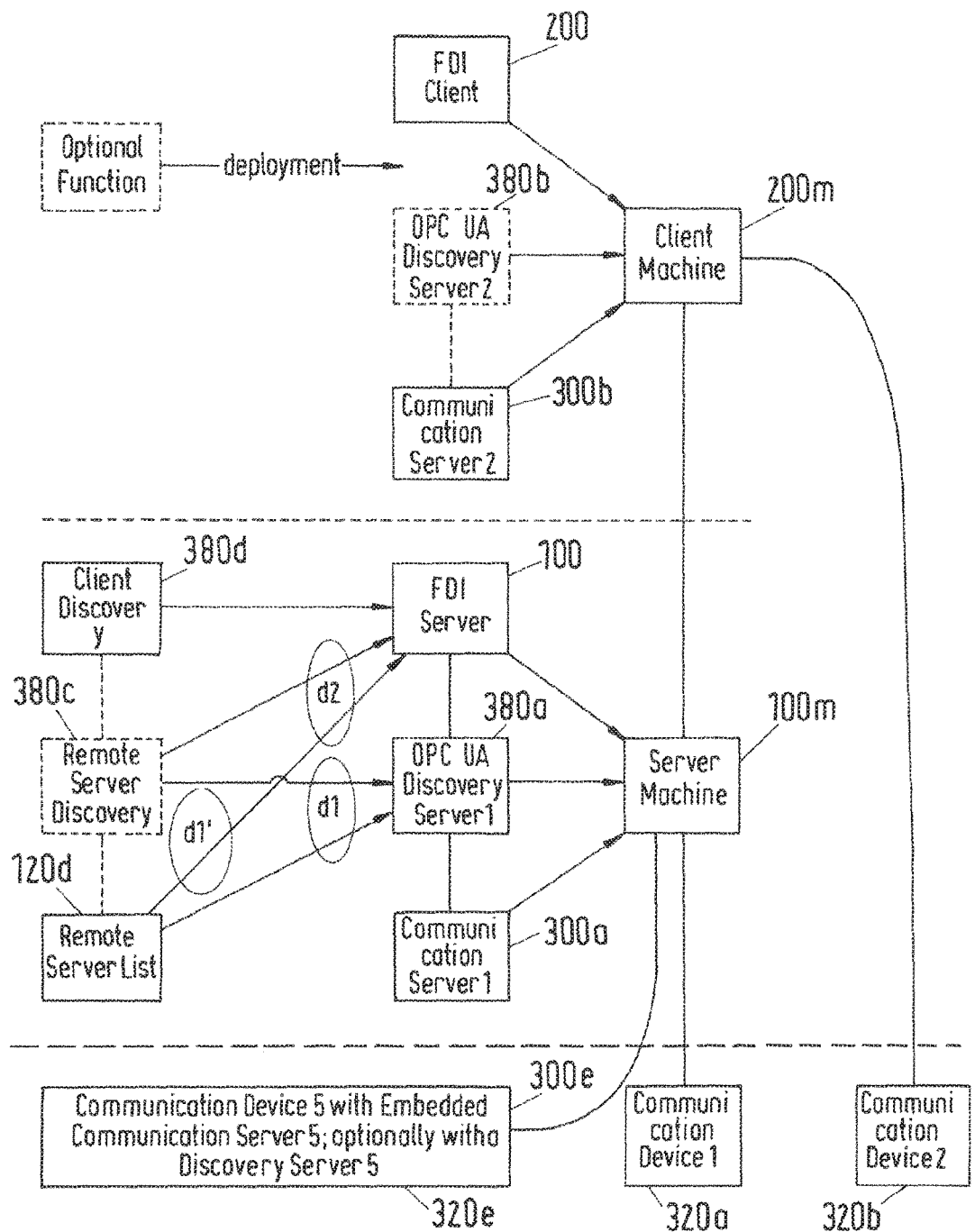
FIG. 4 a exemplary embodiment of a FDI DMS.

In FIG. 4 an exemplary implementation for a DMS comprising an integration system according to the invention is presented, wherein the integration of communication devices in a distributed device management system (DMS) is performed automatically on a continuous or cyclical basis or by request and wherein by means of at least one discovery unit comprising processing means and executable data structures, distributed communication servers and/or devices in a DMS, independent of their location within the DMS, and in particular independent whether they are located within an FDI server, FDI clients, OPC UA discovery servers or stand-alone in the engineering/control/field network, are discovered and determined.

In the example shown in FIG. 4 the FDI Client 200, connecting to the FDI Server 100, makes the client machine 200*m* become a known IP host.

According to a discovery process and set up by OPC UA standard the Communication Servers 300*a,b,e* register along with the FDI client 200 using OPC UA discovery as used by the FDI standard; by this approach, the FDI Server 100 becomes aware of all communication servers 300*a,b,e*. It can then register which of the severs 300*a,b,e* are running on which machine 200*m*, 100*m*, or 320*e*.

According to a central discovery process and set up the second communication Server 2 300*b* on a machine 200*m* registers with the central OPC UA Discovery Server 1 380*a*. This requires the central server to be known to each communication server 300*a,b,e*.

According to a distributed discovery process and set up the second communication server 2 300*b* on a machine 200*m* registers with the local OPC UA Discovery Server 2 380*b*. This requires no configuration of the communication server 300*a,b*

The different processes may be applied alternatively or in combination.

Using the IP address, the FDI Server 100 queries the local OPC UA Discovery Server 2 380*b* on the FDI client machine 200*m*, thus learning about all locally running FDI communication server 2 300*b*. Alternatively, it may request the local discovery server 1 380*a* to perform the query and read in the updated information model of 380*a,b*.

It may also check the availability of the connected communication devices 320*a,b,e*.

The core registration mechanism itself is defined by the OPC UA standard and works in the same manner on any machine.

Figure 5:
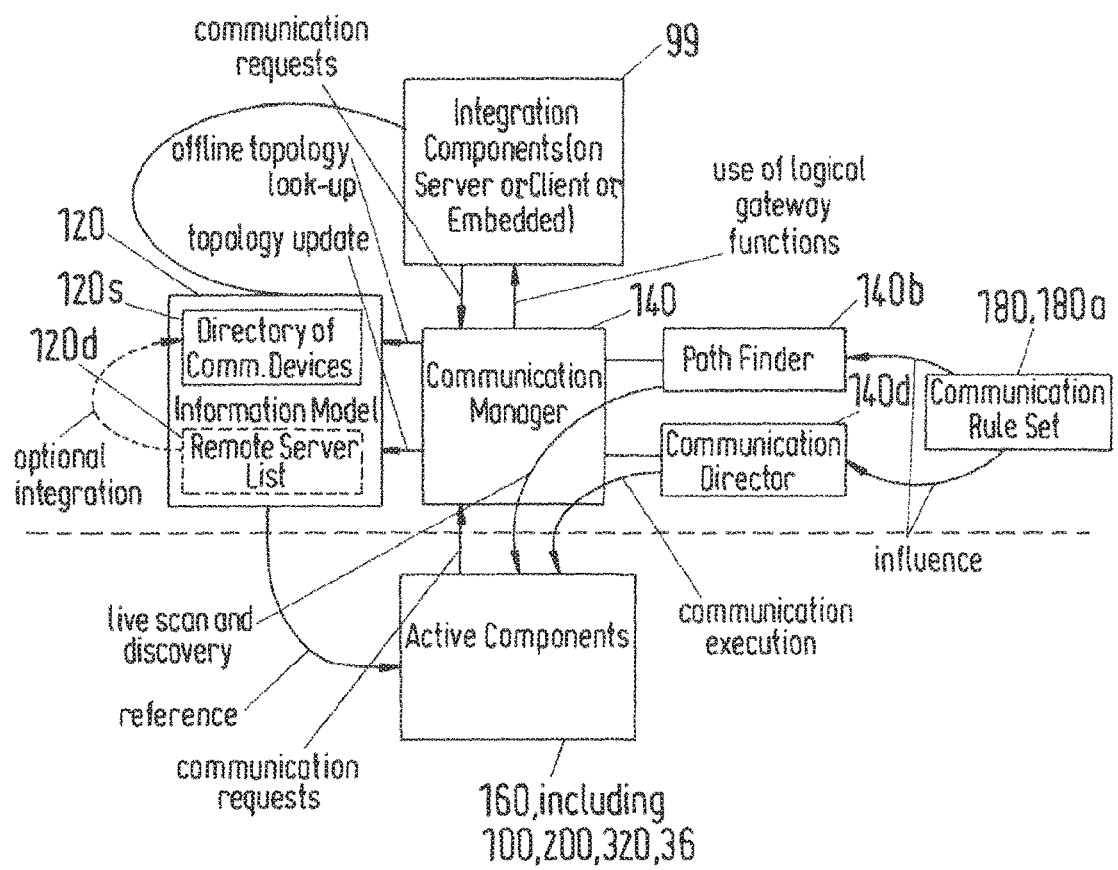
FIG. 5 an exemplary implementation for a DMS comprising an integration system according to the invention.

As disclosed in FIG. 5 the FDI Server 100 reflects and/or provide the discovery results 120d within the standard communication devices directory 120s.

The Communication manager 140 requires no dedicated support to enumerate any of the available communication devices 300a,b,e.

To support the rating 180 of available communication devices 300a,b,e and to enforce access rights on them, the OPC UA object type for communication devices is enhanced with a host attribute referencing the client machine 200m on which it is deployed.

In FIG. 5 an exemplary embodiment of smart nested communication according to the invention is presented.

When handling communication requests from any active FDI component 160, a path finding unit and/or function 140b in the communication manager 140 analyzes possible communication paths. It rates 180 each candidate by applying a communication rule set 180a, depending on where the request comes from 160, 99 and where the communication server 30 is hosted. If the request comes from an FDI Client 200, only communication servers 300a,b on the server machine 100m or on the client machine 200m are used. Clients do not get access to each other's communication devices 320a,b,e.

Accordingly it is possible to reserve communication devices co-located to an FDI client if they have their communication server with built in, for example via the information model.

In addition to restricting the enumeration of valid communication paths, the system further restricts the user visibility of unusable communication devices on the client.

Figure 6:
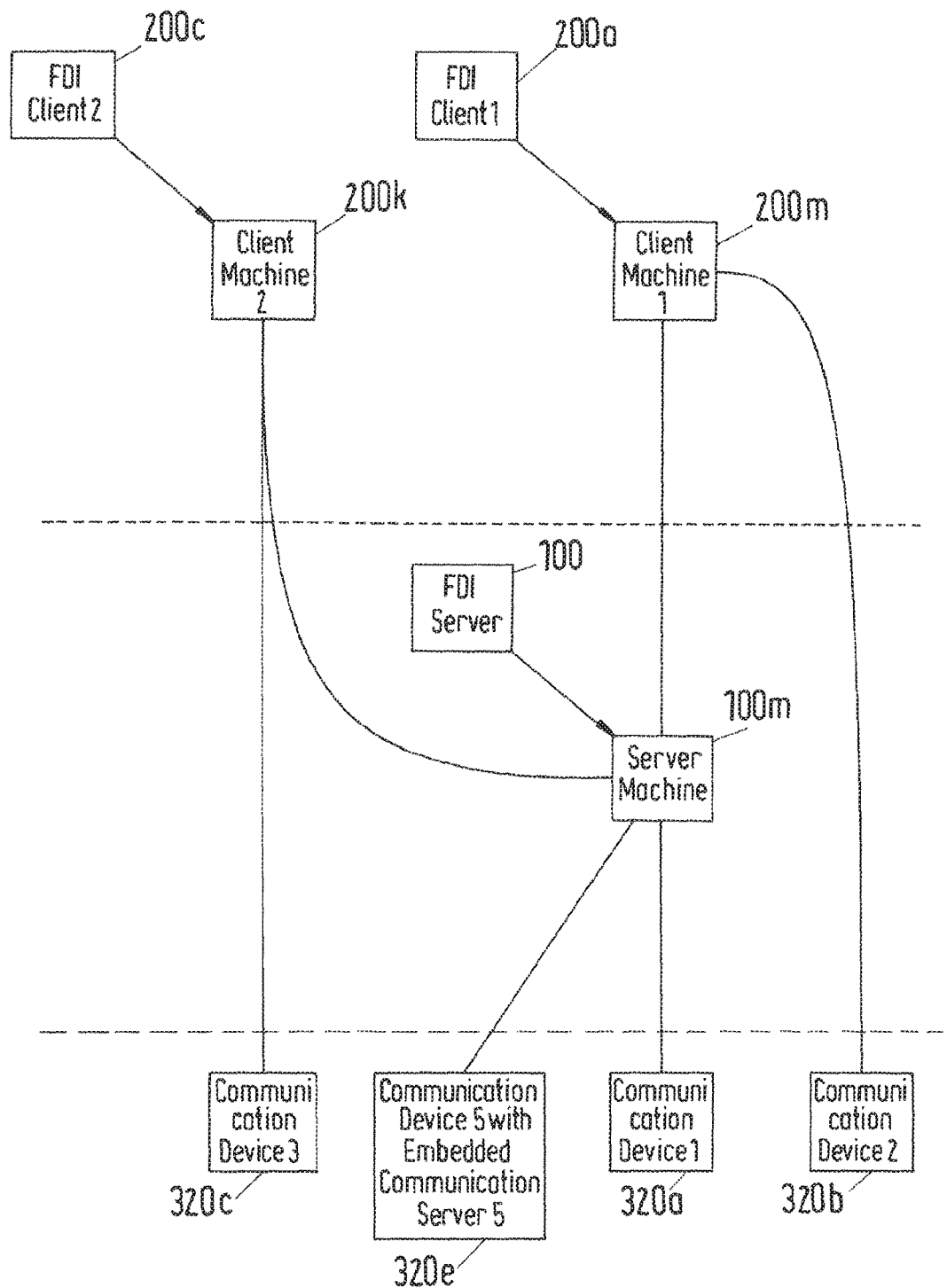
FIG. 6 exemplary smart nested communication according to the invention.

FIG. 6 shows an exemplary embodiment of a DMS wherein a second communication device 2 is connected to a first client 1, and a third communication device 3 is connected to a second client 2.

Note how actual communication, even though being directed from the server 100 as shown in corresponding drawing, always goes through the client machines 200m or 200k, respectively.

The overall accessibility and visibility according to FIG. 6 may be as follows:

|  | Communication Device 1 | Communication Device 2 | Communication Device 3 | Communication Device 5 |
| --- | --- | --- | --- | --- |
| Client 1 | yes | yes | no | Yes |
| Client 2 | yes | no | yes | Yes |
| Server | yes | yes | yes | Yes |

Regardless of the discovery method, a fifth communication device 5 with an embedded communication server is visible like a communication device whose communication server is running on the device management system's server machine 100. For shared infrastructure components such as fieldbus masters, remote IOs, gateways, etc. the location of the communication server thus does not matter or is not relevant.

Showing to a user only communication devices 320a,b.e usable on the client side they may be implemented either on the client by application of a suitable filter or the server 100 may provide a list of already filtered communication devices upon inquiry by a client 200a or 200c.

In addition to these functions and methods, a server may need or decide to restrict the access to Communication Devices upon explicit request by a user or because they are already in use for active communication by another user, client, or system function. This restriction may be required because of bandwidth limitations to protect a defined QoS, because the number of parallel connections through a given path is limited, or to avoid race conditions on write access.

A client may indicate such use of otherwise available communication devices and paths to a user to guide their level of information and expectations for better usability.

From a user or DMS and network administration perspective, this approach is fully transparent. It allows any deployment of communication devices as required by the use-cases and scenarios such as workshops and mobile clients.

Figure 7A:
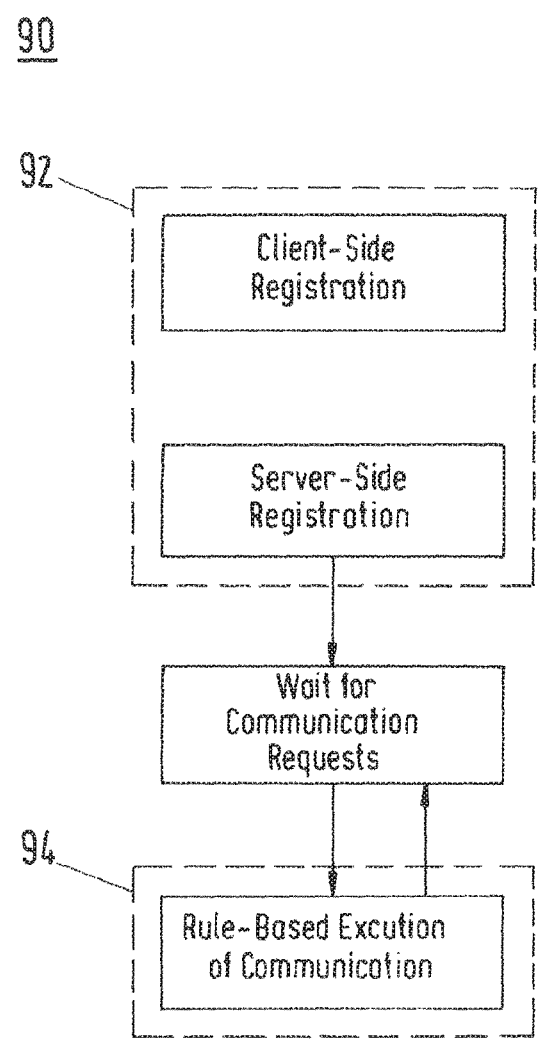
FIG. 7a-b an exemplary implementation of the integration process according to the invention.

In FIG. 7a an exemplary implementation of the proposed integration method for a DMS in a plant automation system is disclosed, wherein in the first step 92 the registration of the communication servers is performed and wherein according to several alternatives the communication servers may register along with the FDI clients using OPC UA discovery as used by the FDI standard; by this approach, the FDI Server becomes aware of all communication servers. It can then register which of the severs are running on which machine.

In another implementation a central discovery process is performed, wherein the communication server 2 on a machine registers with the central OPC UA discovery server 1, which requires the central server to be known to each communication server.

Furthermore, also a distributed discovery process is possible, wherein the communication server 2 on a machine registers with the local OPC UA discovery server 2. This requires no configuration of the communication server.

Using the IP address, the FDI Server queries the OPC UA Discovery Server 2 on the FDI Client, thus learning about all locally running FDI Communication Server. Alternatively, it may request the local Discovery Server to perform the query and read in the updated Information Model. It may also check the availability of the connected communication devices.

Figure 7B:
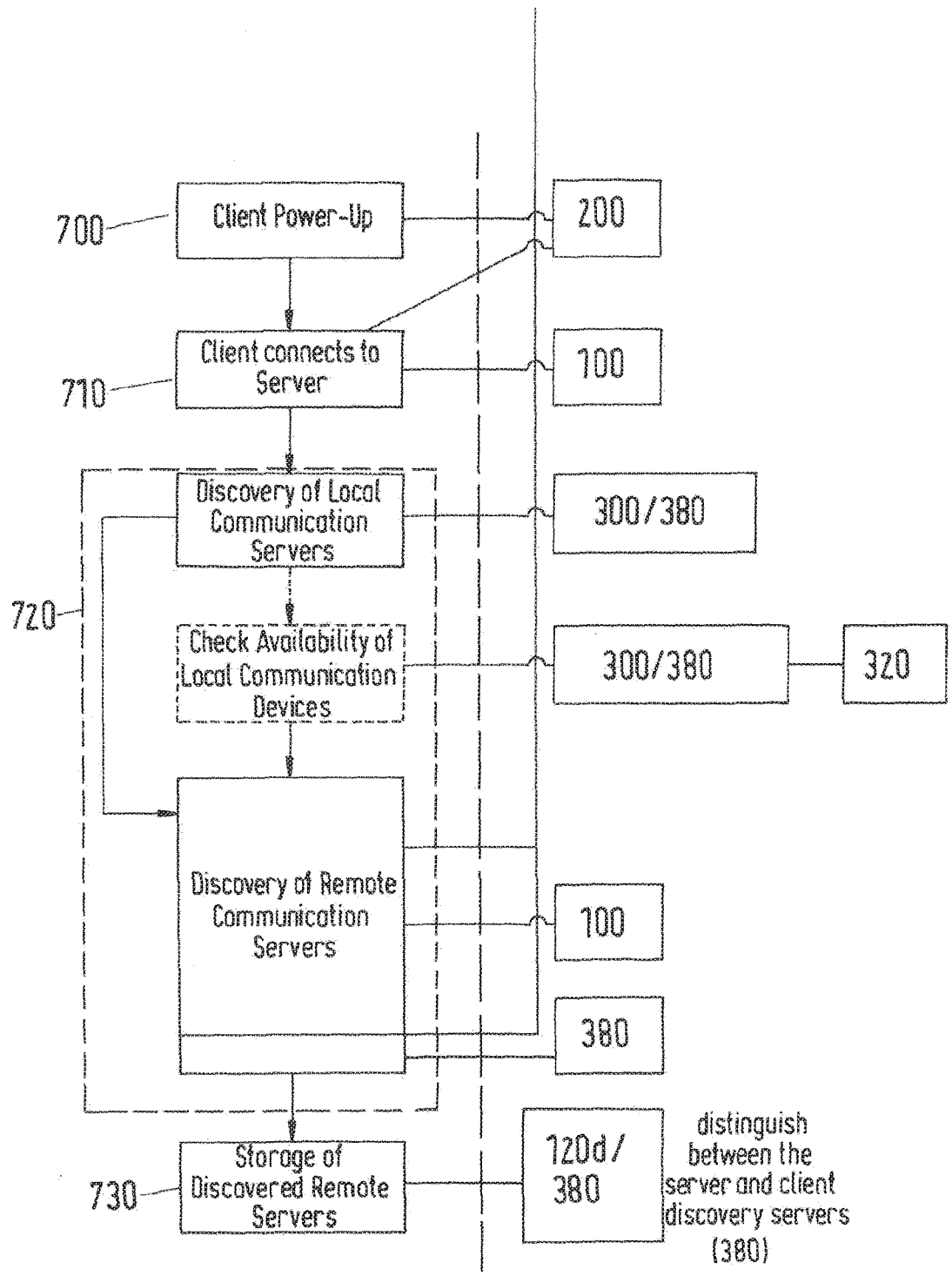

According to FIG. 7b. the FDI client powers up 700 and the FDI Client connects 710 to the FDI Server 100, wherein the Communication Servers 300 register along with the FDI clients 200 using OPC UA discovery as used by the FDI standard wherein all local communication servers are to be discovered. By this approach, the FDI Server 100 becomes aware of all communication servers 300. Furthermore, it is registered which of the severs 300 are running on which machine 200m, 100m or 320 and accordingly also the availability of the connected communication devices is checked.

The discovery process 720 of local communication servers may comprise at least one of
- explicit engineering, like for example an instantiation of communication server references,
- registration of communication servers on the client side, in particular within the local discovery servers.
- self-registration of the communication servers on a central discovery server,
- scanning from the FDI server or the discovery server on the server machine 100m by using either standardized OPC UA mechanisms to query local discovery servers or directly communication servers on the client machines 100m or by using a proprietary approach to check with locally running FDI clients on client machines 100m Furthermore all discovered remote servers are accessibly stored 730.

Furthermore, according to FIG. 7*a* in a further step the origin of each communication request to the location of each communication device that is considered to be used is related and/or linked and/or correlated. The respective information in a further step 94 is provided to smartly direct nested communication requests to the respective communication servers and/or devices and in particular the information may be used to, in particular to rule-base execute communication, select the communication path, in particular including the communication device,
synchronize access to communication devices that are to be shared,
prevent unwanted access to communication devices that are not to be shared, in particular the ones connected to the distributed FDI clients,
balance communication loads,
prioritize the communication devices when enumerating multiple possible communication paths, and to
prioritize the communication devices when requesting (time-consuming) live lists from communication devices Furthermore, the location of the discovered communication servers and/or devices is determined and accessibly stored and/or it is distinguished at least between controller-internal,
field-device-internal,
stand-alone machine,
FDI server machine,
FDI client machine,
locations.

Furthermore, all available remote communication servers are discovered and determined and/or stored in a further step (730 in FIG. 7*b*) on the server machine, in particular within the FDI server or the local discovery server.

Figure 8:
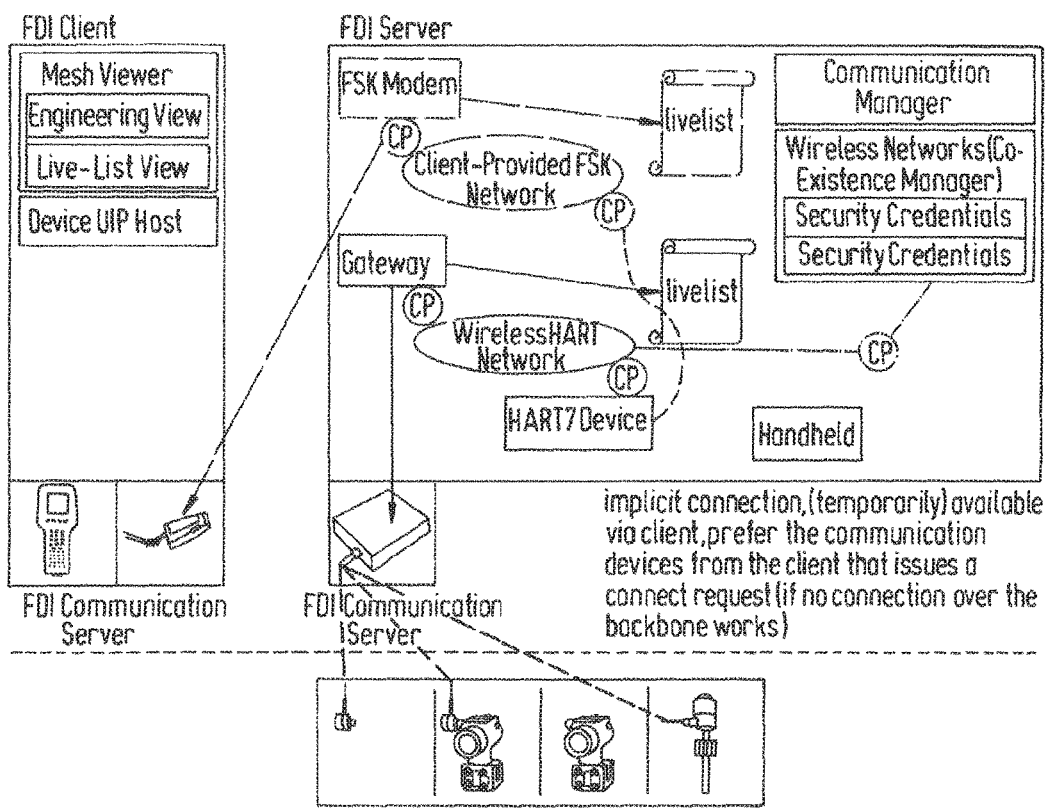
FIG. 8 an exemplary DMS according to the invention.

Furthermore in FIG. 8 an exemplary DMS according to the invention is presented wherein the discovery process the deployment mechanism and/or process is presented.

In real environments not all communication devices of a DMS may be connected via the FDI server. For Workshop scenarios or mobile FDI clients, like for example handhelds, notebooks, mobiles, tablet PC's, FSK modems are connected to the client.

In a distributed Device Management System (DMS), the system functions are distributed over server and client machines, which typically are remote from each other. To support device management in workshop scenarios or on mobile clients in the field, communication devices such as HART FSK modems are required alongside the client machines, i.e. also remote from the server. If DMS functions such as device-specific business logic or support for nested communication are hosted on the server, the client-side communication devices and the server-side functions must be integrated with each other efficiently, preferably in an easy and robust manner with a high quality of performance and data.

The proposed integration system and method comprise processing means on top of basic FDI and OPC UA technology. The provided processing means enable and/or upgrade the server to collects from all DMS machines (clients and servers) the locally available communication devices. Accordingly, this effects the server to direct communication requests to a field device via any suitable communication device, taking into account where field and communication device are located and who owns them in the current device workflow. In particular, this allows for both a sharing of backbone infrastructure via the server and a protection of client-side communication devices against use from other clients and finally leads to a more efficient integration and network utilization.

According to the proposed integration system and method processing means are provided which enable the communication manager of the FDI server to add the "client-provided" servers as dynamic communication devices.

For the purpose of connect requests in the context of a client session, the communication devices from that client receive a high priority, in case if multiple paths to the same device must be evaluated.

When handling communication requests from any active FDI component possible communication paths are analyzed and/or each candidate and/or possible path is rated by applying a rule set, depending on where the request comes from and where the communication server is hosted and/or if the request comes from an FDI client, only communication servers on the server machine or on the client machine are allowed to be used.

The proposed integration system and method generally enables workshop scenarios for FDI in an easy manner, so that no manual registration of temporary communication servers is needed and/or that the connection between communication device and an already existing field device must be first engineered and later removed manually.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A system for integrating communication devices in a distributed device management system (DMS), the DMS capable of having FDI components and OPC UA components applied thereto and/or integrated therein, the system comprising:

at least one discoverer configured to discover and determine distributed operable communication servers and/or the communication devices, each of the communication devices being associated with one of the communication servers and configured to provide access to a respective field device, wherein the discoverer is configured to:
  determine and collect from DMS machines, which include clients and servers, information on locally available ones of the communication devices; and
  provide the information to a respective server of the DMS machines, to enable the respective server to direct communication requests to a field device via any suitable communication device of the communication devices, suitability based upon which client and user owns the field device and the communication devices in a current device workflow.

2. The system of claim 1,
wherein the discoverer is configured to use FDI and OPC UA technology; and
wherein suitability is further based upon where the field device and the communication devices are located with respect to device management clients.

3. The system of claim 1, wherein access rights management are provided to allow communication requests sharing of backbone infrastructure via server-connected or stand-alone communication devices and at the same time to allow protection of client-side communication devices against use from other clients.

4. The system of claim 1, wherein
the discoverer and a corresponding mechanism or process is configured to provide and/or perform at least one of
  explicit engineering;
  scanning from a server;
  self-registration of the communication servers on a central discovery server; and
  registration of client side communication servers.

5. The system of claim 1, wherein the discoverer is configured to determine and remember a location of discovered ones of the communication servers and/or of the communication devices, and
  to distinguish at least between:
    controller-internal,
    field-device-internal,
    stand-alone machine,
    FDI server machine, and
    FDI client machine.

6. The system of claim 1, wherein information about locally available communication devices is being stored on a server machine.

7. The system of claim 1, further comprising:
a communication manager of the DMS configured to relate and/or link and/or correlate an origin of each communication request to a location of each communication device that the communication manager considers to use.

8. The system of claim 1, further comprising:
a communication manager of the DMS configured to use provided information to direct nested communication requests to respective ones of the communication servers and/or of the communication devices, and to use the provided information to perform at least one of:
select a communication path;
synchronize access to the communication devices that are to be shared among all users or clients, respectively;
prevent unwanted access to the communication devices that are not to be shared among all the users or the clients;
balance communication loads;
prioritize the communication devices when enumerating multiple possible communication paths; or
prioritize the communication devices when requesting lists from the communication devices.

9. The system of claim 1, further comprising:
a rater configured to perform a rating of available ones of the communication devices,
wherein to support the rating of the available communication devices and to enforce access rights on them, the OPC UA object type for communication devices is enhanced with a host attribute referencing a machine on which it is deployed.

10. The system of claim 1, further comprising:
a path finder provided by or applied to a communication manager, the path finder being configured to analyze possible communication paths
when handling communication requests from any active FDI component.

11. The system of claim 10, further comprising:
a path finder, configured to rate each candidate path and/or possible path by applying a rule set, the rule set including at least one rule based upon where a request comes from, based upon where a communication server is hosted, or requiring that if the request comes from an FDI client, only communication servers on a server machine or on a client machine from which the request originates are allowed to be used.

12. A Device Management System, comprising:
the system of claim 1.

13. The system of claim 1, wherein the communication servers are client-side communication servers.

14. The system of claim 1, configured to discover and determine distributed operable communication servers and/or devices,
  independent of their location or
  independent whether the communication servers and/or devices are located within the components of the DMS or embedded in stand-alone components in the engineering, control, and/or field network.

15. A method for integrating communication devices in a distributed device management system (DMS), the DMS capable of having FDI components and OPC UA components applied thereto and/or integrated therein, the method comprising:
  discovering and determining distributed operable communication servers and/or the communication devices, independent from their location;
  determining and collecting, from DMS machines, which includes clients and servers, information on locally available ones of the communication devices; and
  providing the information to a respective server of the DMS machines for use by the respective server to direct communication requests to a field device via any suitable communication device, suitability being based upon who owns the field device and the communication devices in a current device workflow,
  wherein each of the communication devices is associated with one of the communication servers and is configured to provide access to a respective field device.

16. The method of claim 15, which is based on FDI and OPC UA technology,
  wherein suitability is further based upon where the field device and the communication devices are located; and
  comprising storing the information about locally available ones of the communication devices on the respective server, which is an FDI server or a local discovery server.

17. The method of claim 15, further comprising:
providing or performing, via a discovery mechanism or process, at least one of
explicit engineering, including an instantiation of communication server references in an FDI server's information model;
scanning from a server, which is the FDI server or a discovery server;
self-registering the communication servers on a central discovery server; and
registering client side communication servers within local discovery servers.

18. The method of claim 15, further comprising:
determining and remembering a location of discovered ones of the communication servers and/or of the communication devices; and differentiating at least between:
controller-internal,
field-device-internal,
stand-alone machine,
FDI server machine, and
FDI client machine.

19. The method of claim 15, further comprising:
relating and/or linking and/or correlating, using a communication manager of the DMS, an origin of each communication request to a location of each communication device that the communication manager considers to use and/or
directing, via the communication manager of the DMS, using provided information, nested communication requests to respective communication servers and/or devices and, optionally, with the provided information,
selecting a communication path, including a communication device,
synchronizing access to the communication devices that are to be shared,
preventing unwanted access to the communication devices that are not to be shared, including the communication devices connected to distributed FDI clients,
balancing communication loads,
prioritizing the communication devices when enumerating multiple possible communication paths, and/or
prioritizing the communication devices when requesting lists from communication devices.

20. The method of claim 15, further comprising:
rating available communication devices; and
to support the rating of available communication devices and to enforce access rights on them, enhancing an OPC UA object type for communication devices with a host attribute referencing the machine on which it is deployed and/or, when handling communication requests from any active FDI component, analyzing possible communication paths, and/or rating each candidate and/or possible path by applying a rule set, depending on where a request comes from and where a communication server is hosted and/or if the request comes from an FDI client, only communication servers on the server machine or on the client machine are allowed to be used.

* * * * *